United States Patent [19]
Ishida

[11] Patent Number: 6,025,936
[45] Date of Patent: Feb. 15, 2000

[54] IMAGE READING DEVICE

[75] Inventor: Satoshi Ishida, Ishikawa, Japan

[73] Assignee: PFU Limited, Ishikawa, Japan

[21] Appl. No.: 08/715,402

[22] Filed: Sep. 18, 1996

[30] Foreign Application Priority Data

Sep. 20, 1995 [JP] Japan ................................ 7-267662

[51] Int. Cl.[7] .............................. H04N 1/04; H04N 1/00
[52] U.S. Cl. ......................... 358/498; 358/496; 358/497
[58] Field of Search .................................. 358/498, 406, 358/496, 497

[56] References Cited

U.S. PATENT DOCUMENTS

| | | | |
|---|---|---|---|
| 5,155,603 | 10/1992 | Seok-Jae | 358/498 |
| 5,493,422 | 2/1996 | Morikawa et al. | 358/474 |
| 5,755,435 | 5/1998 | Fujiwara | 271/4.04 |

FOREIGN PATENT DOCUMENTS 41 06 410  8/1991  Germany .

*Primary Examiner*—Edward L. Coles
*Assistant Examiner*—Twyler Lamb
*Attorney, Agent, or Firm*—Staas & Halsey LLP

[57] ABSTRACT

An image reading device including an image reading unit, a pick roller, and a single feed roller. A projection is provided on the roller shaft, and a pawl is provided in the pick roller, so that the projection can engage with the pawl to transmit the rotation of the roller shaft to the pick roller, and the projection can disengage from the pawl to allow the pick roller to freely rotate relative to the roller shaft. In a further aspect, a sheet separating pad assembly comprises a pad mount member pivotally attached to the frame by a pivot shaft, a sheet separating pad supported by the pad mount member, a backing pad swingably attached to the pad mount member by a backing pad shaft, and a spring arranged below the backing pad shaft to urge the backing pad to thereby urge the sheet separating pad to the pick roller.

12 Claims, 8 Drawing Sheets

IMAGE READING DEVICE

BACKGROUND OF THE INVENTION

1. Field of the Invention

The present invention relates to an image reading device for reading information such as letters or figures on a document as electric signals. In particular, the present invention relates to an automatic sheet feeding type image reading device for conveying sheets stacked on a hopper one by one to a reading unit for reading the conveyed sheet.

2. Description of the Related Art

One of the known automatic sheet feeding type image reading devices is shown in FIG. 15 of the attached drawings. This image reading device includes two feed rollers 41 and 9 arranged on a sheet conveying passage on the upstream side and on the downstream side of a reading head 18, and a pick (and sheet separating) roller 1 for picking and conveying sheets 7 stacked on a hopper 42 one by one. There are two types of pick rollers 1, one being arranged separately from the sheet separating roller, and the other having the functions of picking the sheet and separating the sheet. In any case, two feed rollers 41 and 9 are distinct from the pick roller 1.

In the structure having two feed rollers 41 and 9, the sheet 7 picked by the pick roller 1 impinges against the feed roller 41, so the skewing of the sheet 7 is corrected. Two feed rollers 41 and 9 are driven at an identical rotational speed, so that the sheet 7 from its leading edge to its trailing edge is conveyed at a constant speed.

However, with the development of office automation apparatuses, demands for small and inexpensive apparatuses are increasing. To meet such demands, there is proposed an image reading device including only one feed roller 9 on the downstream side of the image reading head 18, the feed roller 41 on the upstream side of the image reading head 18 being omitted, as shown in FIG. 16. Thus, the pick roller 1 must carry out the function of the feed roller 41 on the upstream side of the image reading head 18.

In the image reading device of FIG. 16, the sheets 7 are stacked on the hopper 42, and are picked one by one in the order of the stack from the top to the bottom, due to a frictional entraining force from the pick roller 1. A pick spring 25 and a sheet separating pad 12 are arranged to resiliently contact the surface of the pick roller 1. The pick spring 25 comprises a smooth leaf spring which urges the sheet 7 to the pick roller so that the frictional entraining force from the pick roller 1 is reliably transmitted to the sheet 7. The sheet separating pad 12 contacts the lower surface of the sheet 7 and gives a frictional resistance to the sheet 7 in order to stop a plurality of sheets 7 from passing therethrough.

Information is carried by the sheet 7, and the sheet 7 introduced into the image reading device is read by the reading head 18 when the sheet 7 passes through the reading head 18. After the leading edge of the sheet 7 is pinched by the feed roller 9, the sheet 7 is conveyed by the feed roller 9 and the reading operation is continued. The sheet 7 is then discharged to a stacker 49. A sensor 50 is arranged at a position on the upstream side of the image reading head 18 for detecting the leading and trailing edges of the sheet 7. In this type of the image reading device, the rotational (peripheral) speed of the feed roller 9 is slightly higher than that of the pick roller 1 to provide tension to the sheet 7, and there is a distance or a gap between the successively conveyed sheets 7 while the sheet conveying motor is continuously rotated.

The pick roller 1 is attached to a roller shaft 2, as shown in FIG. 17. FIG. 17 shows an example, in which the pick roller 1 is stopped for a short time between the previously conveyed sheet and the next sheet 7 to be conveyed while the roller shaft 2 is continuously rotated, so that there is a distance between the successively conveyed sheets 7. In this structure, the pick roller 1 is fixed to the roller shaft 2, and the roller shaft 2 has a stepped portion 43 having a D-cut 44 for preventing rotation. A sleeve 45, a clutch spring 46, and a drive gear 6 are arranged on the narrow shaft portion extending from the stepped portion 43, and they are axially fixed by a snap ring 5. The drive gear 6 is rotatable relative to the roller shaft 2, and one end of the clutch spring 46 is fixed to the drive gear 6. The sleeve 45 is fitted on the D-cut 44 and is not rotatable relative to the roller shaft 2. The sleeve 45 has a pawl 47 for engaging with the end of the clutch spring 46. The clutch spring 46 is a coil spring and one end thereof engages with the pawl 47. The arrow "a" indicates the rotational direction of the pick roller 1, and the arrow "b" indicates the travelling direction of the sheet 7.

The drive gear 6 rotates in the direction of the arrow "a" (the rotational direction of the pick roller 1) at a constant speed. According to this rotational direction, the clutch spring 46 is tightened. Therefore, the clutch spring 46 is twisted so that the diameter thereof is reduced, and the clutch spring 46 can transmit the rotation of the drive gear 6 to the roller shaft 2. The pick roller is thus rotated and the sheet 7 is conveyed. When the sheet 7 is pinched by the feed roller 9 (FIG. 16), the pick roller 1 is pulled by the sheet 7 since the rotational speed of the feed roller 9 is faster than that of the pinch roller 1. Thus, the rotational speed of the sleeve 45 becomes slightly higher than that of the drive gear 6, so the clutch spring 46 is gradually loosened. When the trailing edge of the sheet 7 leaves the pick roller 1, the rotation of the pick roller 1 is stopped while the drive gear 6 again tightens the clutch spring 46. Therefore, there is a distance between the successively conveyed sheets 7, corresponding to the stopping of the pick roller 1.

The distance between the successively conveyed sheets 7 changes according to the length of the sheet 7, as can be understood from the above description. The clutch spring 46 is subjected to a stress both in the spring tightening direction and in the spring loosening direction, and an excessive stress acts in the spring loosening direction if the sheet is longer than a standard one.

In the case of the image reading device having only one feed roller 9, as shown in FIG. 16, the sheet 7 is conveyed at a speed corresponding to the rotational (peripheral) speed of the pick roller 1 until the leading edge of the sheet is pinched by the feed roller 9. The sheet sometimes slides relative to the pick roller 1, since the rotational speed of the pick roller 1 is slower than that of the feed roller 9 and load is applied to the sheet 7 from the sheet separating pad 12 and from the subsequent sheet 7. Therefore, the speed of the leading edge of the sheet 7 at the reading head 18 is slower than the speed of the leading edge of the sheet 7 when the latter is pinched by the feed roller 9. Therefore, a drawn out image is produced when the leading portion of the sheet 7 is read by the reading head 18.

In addition, in the case of the image reading device having only one feed roller 9, as shown in FIG. 16, when the sheet skews, there is no means to correct the skewing. In particular, in the structure in which the top sheet 7 is picked by the pick roller 1, the top sheet 7 does not receive the weight of other sheets 7; if the weight of the other sheets is applied to the sheet to be picked, such a weight may resist the skewing of the sheet. Therefore, if an unbalance force acts on the sheet along the width thereof, the skewing of the sheet occurs to a greater extent.

SUMMARY OF THE INVENTION

The object of the present invention is to provide an automatic sheet feeding type image reading device which is smaller in size and inexpensive.

Another object of the present invention is to provide an image reading device which can provide an appropriate distance between the successive sheets irrespective of the length of the sheets although the structure is simple and not damaged when an overload occurs.

A further object of the present invention is to provide an image reading device in which a drawn out image is not caused when the leading portion of the sheet is read.

A further object of the present invention is to provide an image reading device by which the skewing of the sheet can be obviated.

A further object of the present invention is to provide an image reading device which includes a sheet separating pad which can be easily replaced.

According to the present invention, there is provided an image reading device comprising a frame, a hopper for placing sheets to be read thereon, an image reading unit, a pick roller assembly for picking a sheet on the hopper and conveying the sheet toward the image reading unit, and a feed roller arranged on the opposite side of the pick roller from the image reading unit. The pick roller assembly comprises a roller shaft, a pick roller rotatably and axially immovably fitted on the roller shaft and a drive member for rotating the roller shaft. The image reading device also comprises at least one projection provided on the roller shaft, and at least one pawl provided in the pick roller, the at least one projection being able to engage with the at least one pawl to transmit the rotation of the roller shaft to the pick roller, the at least one projection being able to disengage from the at least one pawl to allow the pick roller to freely rotate relative to the roller shaft.

In this arrangement, it is possible to provide an appropriate distance between the successive sheets while the pick roller is rotated at a constant rotational speed. The image reading device can be made simple and the number of the parts is reduced. The structure is simple and not damaged when an overload occurs.

Preferably, the pick roller has a cylindrical end portion having a cavity, the at least one pawl inwardly projecting from the cylindrical end portion. In this case, preferably, the cavity has a bottom wall, and the at least one pawl can contact the bottom wall of the cavity in the cylindrical end portion to restrict the axial movement of the pick roller relative to the roller shaft.

Preferably, the image reading device further comprises a one-way clutch between the roller shaft and the drive member allowing the roller shaft to rotate at a peripheral speed higher than the peripheral speed of the drive member when the pick roller is rotated by the sheet travelling at a speed higher than the peripheral speed of the drive member. According to this feature, it is possible to provide a constant, relatively small distance between the successive sheets even if the length of the sheets is relatively long, and thus it is possible to increase the throughput. In addition, the sheet does not slip too much relative to the pick roller even if the length of the sheets is longer than a standard length and the image reading device is not damaged when an overload occurs.

Preferably, the image reading device further comprises a cushion adapted to contact the roller shaft to give a rotation load to the roller shaft. According to this feature, it is possible to provide a constant distance between the successive sheets even if the load applied to the pick roller is great.

Preferably, the frame includes a plastic frame portion, the plastic frame portion having an integral flexible arm and a thrust flange at the end of the flexible arm, the thrust flange contacting the roller shaft to give a rotation load to the roller shaft due to resilient deformation of the flexible arm.

In the second aspect of the present invention, there is provided an image reading device comprising a frame, a hopper for placing sheets to be read thereon, an image reading unit, a pick roller for picking a sheet on the hopper and conveying the sheet toward the image reading unit, a feed roller arranged on the opposite side of the pick roller from the image reading unit, and a control unit for controlling the pick roller and the feed roller such that the feed roller is rotated at a first rotational speed, and the pick roller is rotated at a second rotational speed lower than the first rotational speed until a leading edge of a sheet reaches a position just before the feed roller and at a third rotational speed lower than the first and second rotational speeds after the leading edge of the sheet passes through the position.

According to this feature, the feed roller is rotated at a first rotational speed which is higher than the rotational speed of the pick roller. The rotational speed of the pick roller is changed when a leading edge of a sheet reaches a position just before the feed roller. It is possible to prevent a drawn out image caused when the leading portion of the sheet is read.

In the third aspect of the present invention, there is provided an image reading device comprising a frame, a hopper for placing sheets to be read thereon, an image reading unit, a pick roller for picking a sheet on the hopper and conveying the sheet toward the image reading unit, a sheet separating pad assembly for contacting the pick roller for preventing a plurality of sheets from being simultaneously conveyed. The sheet separating pad assembly comprises a pad mount member, a sheet separating pad supported by the pad mount member, a backing pad swingably attached to the pad mount member by a backing pad shaft extending perpendicular to an axis of the pick roller for urging the sheet separating pad to the pick roller, and a spring arranged below the backing pad shaft to urge the backing pad to thereby urge the sheet separating pad toward the pick roller.

According to this feature, it is possible to obtain a simple and smaller image reading device which can solve an unbalance force acting on the sheet along the width thereof to thereby prevent the skewing of the sheet even if there is an error in the parts.

Preferably, the image reading device further comprises a pivot shaft extending parallel to the axis of the pick roller for pivotally attaching the pad mount member to the frame.

Preferably, the backing pad shaft is integrally formed with the backing pad and has at its free end a laterally extending locking pawl, and the pad mount member has a backing pad shaft hole 27 in which the backing pad shaft is inserted, the backing pad shaft hole having a wide bottom in which the locking pawl of the backing pad shaft can be accommodated, the pad mount member also having slits 35 adjacent to the backing pad shaft hole to allow the locking pawl to pass therethrough while the backing pad shaft is inserted in the backing pad shaft hole. In addition, the pivot shaft is formed in the form of low projections extending from the side surfaces of the pad mount member, and the pad mount member has a cutout allowing the pad mount member to bend by pressing the side surfaces of the pad mount member, the frame having pivot shaft holes in which the projections forming pivot shaft are rotatably secured.

Preferably, the backing pad comprises a support plate and covers arranged in a staggered manner, the sheet separating pad being inserted between the support plate and the covers, the sheet separating pad having at least one fixing pin, one of the support plate and the covers having at least one fixing hole in which the at least one fixing pin is inserted.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 1:
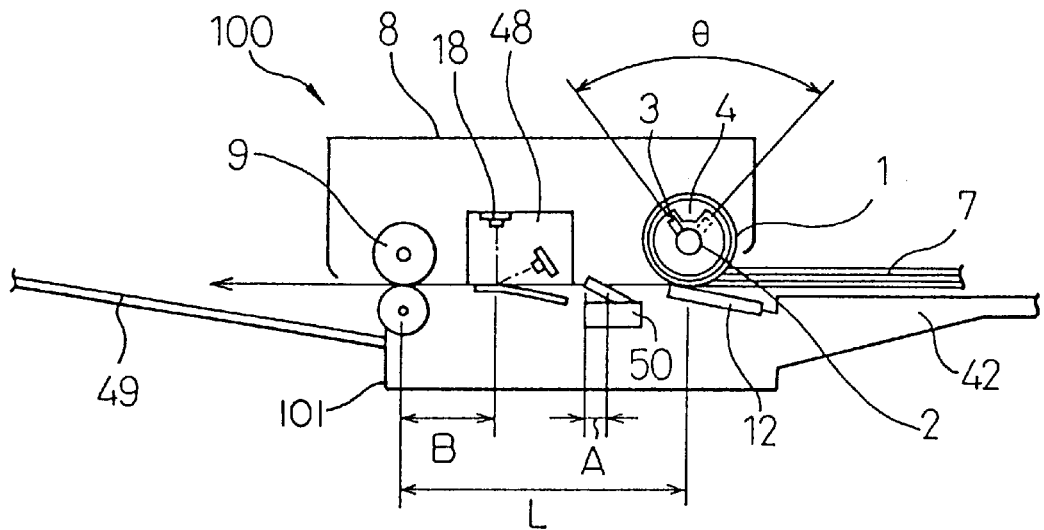
FIG. 1 is a side view of an image reading device according to the first embodiment of the present invention.
Figure 2:
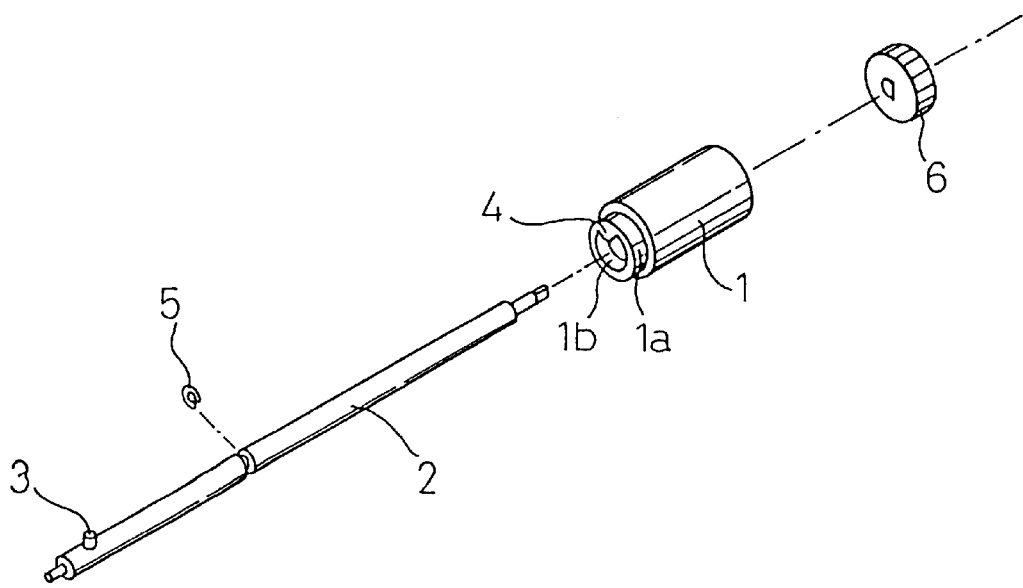
FIG. 2 is an exploded, perspective view of the pick roller assembly of FIG. 1.

FIGS. 1 and 2 show an image reading device according to the first embodiment of the present invention. The image reading device 100 comprises a frame 101 and a top cover 8. A hopper 42 is arranged on one side of the frame 101 and a stacker 49 is arranged on the other side of the frame 101. Sheets 7, i.e., documents or printed papers to be read can be stacked on the hopper 42 and the read sheets 7 are discharged from the image reading device 100 to the stacker 49. The image reading device 100 also includes a pick roller 1, a reading unit 48 with a light source and a reading head 18, and a feed roller 9 (with a cooperating pinch roller). A sheet separating pad 12 is arranged below the pick roller 1.

The pick roller 1 is adapted to pick one sheet 7 of the stacked sheets 7 on the hopper 42 and convey the sheet 7 toward the reading unit 48 and the feed roller 9. The sheet separating pad 12 applies friction to the lower surface of the sheet 7, to prevent two or more sheets 7 from being simultaneously fed. The reading unit 48 can be of any conventional design. A sheet sensor 50 is arranged near the reading unit 48 to detect the passage of the leading edge of the sheet 7.

The pick roller 1 is rotatably attached to a roller shaft 2. The roller shaft 2 has at one end thereof a projection 3, and the pick roller 1 has a cylindrical end portion 1a having a cavity 1b and an inwardly projecting pawl 4. The projection 3 can contact one side surface of the pawl 4, so that the rotation of the roller shaft 2 is transmitted to the pick roller 1 when the former rotates. The projection 3 can also contact the bottom wall of the cavity 1b in the cylindrical end portion 1a, and a snap ring 5 is fitted to the roller shaft 2 on the opposite side of the cylindrical end portion 1a from the pick roller 1. Accordingly, the pick roller 1 is axially immovable with respect to the roller shaft 2. A drive gear 6 is fixed to the other end of the roller shaft 2, the drive gear 6 being operably connected to a not shown drive motor.

In FIGS. 1 and 2, the projection 3 is arranged at one position on the outer circumferential surface of the roller shaft 2, and the pawl 4 is also arranged at one position in the inner circumferential surface of the cylindrical end portion 1a of the pick roller 1. Therefore, when the rotational direction of the pick roller 1 relative to the roller shaft 2 is reversed, there is play between the pick roller 1 and the roller shaft 2, i.e., the rotation of the roller shaft 2 is not transmitted to the pick roller 1, until the projection 3 contacts the other side surface of the pawl 4 after the projection 3 rotates nearly one turn relative to the pawl 4. This structure is very simple and the number of parts is very small.

In the operation of the image reading device 100 of FIGS. 1 and 2, the drive gear 6 is rotated in the sheet conveying direction (the clockwise direction in FIG. 1) at a constant speed. The rotation of the drive gear 6 is transmitted to the roller shaft 2, and the pick roller 1 is synchronously rotated with the roller shaft 2 due to the engagement of the projection 3 with the pawl 4 after the projection 3 contacts one side surface of the pawl 4. With this rotation of the pick roller 1, one sheet 7 in the stack of the sheets is picked and conveyed toward the reading unit 48. The reading head 18 then starts to read the information on the sheet 7.

The leading edge of the sheet 7 is then pinched by the feed roller 9 (and the cooperating pinch roller). The peripheral speed of the feed roller 9 is slightly faster than that of the pick roller 1, so the pick roller 1 is driven by the feed roller 9 via the sheet 7. Therefore, the clockwise rotation of the pick roller 1 in FIG. 1 is faster than that of the roller shaft 2, and the projection 3 is disengaged from the pawl 4, with the result that the projection 3 rotates in the cylindrical end portion 1a of the pick roller 1 in the anti-clockwise direction relative to the pawl 4. When the trailing edge of the sheet 7 passes through the pick roller 1 after the projection 3 is disengaged from the pawl 4, the pick roller 1 is not driven by the feed roller 9. The pick roller 1 is then driven by the rotating roller shaft 2 when the projection 3 returns to contact the pawl 4. That is, while the projection 3 freely rotates relative to the pawl 4, the pick roller 1 substantially stops rotating. When the next sheet 7 is then picked and conveyed, there is a distance or a gap between the successive sheets 7 corresponding to the stopped period of the pick roller 1.

This embodiment provides a very simple structure. However, the distance between the sheets 7 changes if the length of the sheet 7 changes. If the length of the sheet 7 is too long, there is a possibility that the projection 3 may contact the other side surface of the pawl 4, and there may be an undesirable movement between the peripheral surface of the pick roller 1 and the sheet 7.

Therefore, it is desirable to satisfy the following relationships to solve the above described problem.

$$A \leq (l_{min}-L) \times (l-Fe_1/Fe_9) \quad (1)$$

$$l_{max} \leq \pi d_1 \times (360-\theta) \div 360 \div (l-Fe_1/Fe_9) \quad (2)$$

where,

A is the detecting span of the sheet sensor 50;

B is the length of a portion of the sheet 7 which is read while the sheet 7 is not pinched by the feed roller 9;

L is the roller span;

$d_1$ is the diameter of the pick roller 1;

(360–θ) is the freely rotatable angle of the pick roller 1 from the point of the projection 3 disengaged from one side surface and to the point of the projection 3 engaged with the other side surface of the pawl 4;

$l_{min}$ is the minimum length of the usable sheet 7;

$l_{max}$ is the maximum length of the usable sheet 7; and $Fe_1/Fe_9$ is the ratio of the peripheral speed of the pick roller 1 to that of the feed roller 9.

The relationship (1) is obtained from the condition that the distance between the successive sheets 7 must be greater than the detecting span of the sheet sensor 50 in order to detect the leading edge of the sheet 7, and the relationship (2) is obtained from the condition that the trailing edge of the sheet 7 must leave the pick roller 1 before the projection 3 contacts the other side surface of the pawl 4. In addition, it is desirable to select the ratio of the peripheral speeds so that a drawn out image caused when the sheet 7 is read while the sheet 7 is not pinched by the feed roller 9 (in the region B), does not actually occur.

Figure 3:
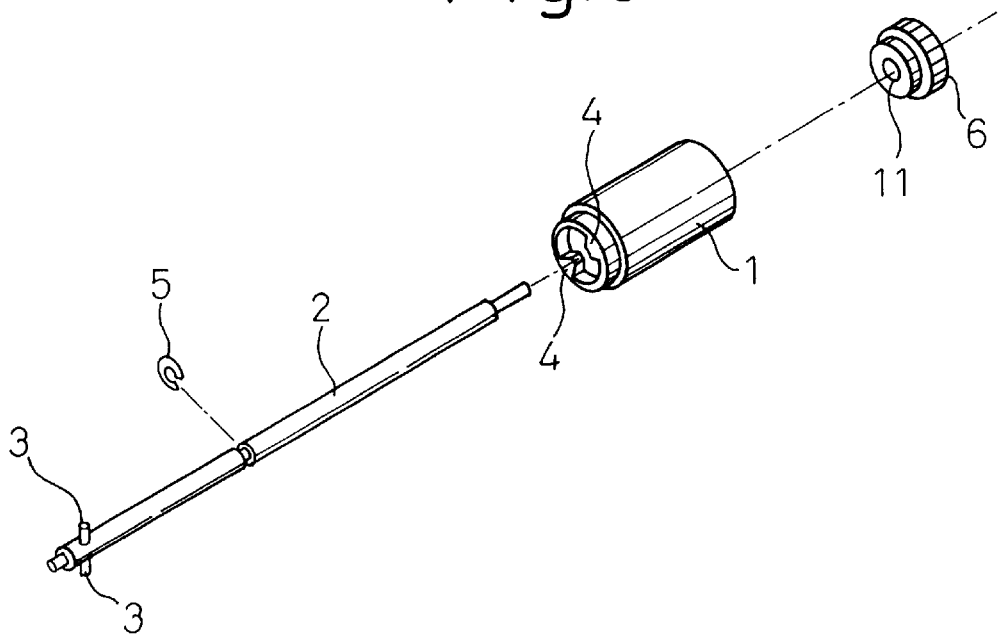
FIG. 3 is an exploded, perspective view of another example of the pick roller assembly.
Figure 4:
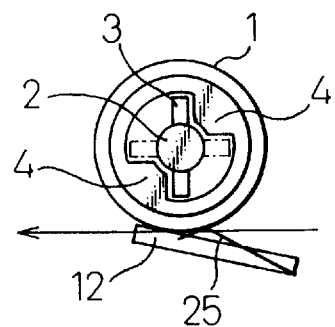
FIG. 4 is a side view of the pick roller assembly of FIG. 3.

FIGS. 3 and 4 show another example of the pick roller assembly. In this example, the freely rotatable angle of the pick roller 1 (360–θ in FIG. 1) is restricted to a smaller angle. In addition, a one-way clutch 11 is arranged between the gear 6 and the roller shaft 2, the one-way clutch 11 allowing the roller shaft 2 to rotate in the direction in which the pick roller 1 is driven by the feed roller 9 via the sheet 7. In FIGS. 3 and 4, two projections 3 are arranged on the outer peripheral surface of the roller shaft 2 at diametrically opposite positions, and two trapezoid pawls 4 are arranged in the inner peripheral surface of the cylindrical end portion of the pick roller 1 at diametrically opposite positions. The freely rotatable angle of the pick roller 1 rotatably attached to the roller shaft 2 is restricted to approximately 90 degrees.

In this example, when the pick roller 1 rotates approximately 90 degrees relative to the roller shaft 2 after the leading edge of the sheet 7 is pinched by the feed roller 9, the projection 3 may contact the other side surface of the pawl 4 and the rotation of the pick roller 1 driven by the feed roller 9 is transmitted to the roller shaft 2. This rotation is allowed by the one-way clutch 11, and movement does not occur between the surface of the pick roller 1 and the sheet 7. When the trailing edge of the sheet 7 leaves the pick roller 1, the pick roller 1 stops to rotating, but the roller shaft 2 is immediately driven by the motor via the one-way clutch 11. Therefore, the pick roller 1 can rotate after the roller shaft 2 rotates approximately 90 degrees relative to the pick roller 1.

In this example, even if the length of the sheet 7 is very long, the rotation of the pick roller 1 driven by the feed roller 9 is not obstructed and there is no undesirable movement between the peripheral surface of the pick roller 1 and the sheet 7. In addition, irrespective of the length of the sheet 7, the distance between two successively conveyed sheets 7 is a constant value corresponding to the freely rotatable angle of the pick roller 1 (approximately 90 degrees in this example).

Figure 5:
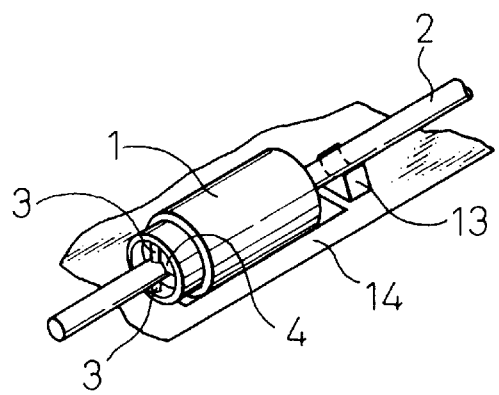
FIG. 5 is a perspective view of a further example of the pick roller assembly.
Figure 6:
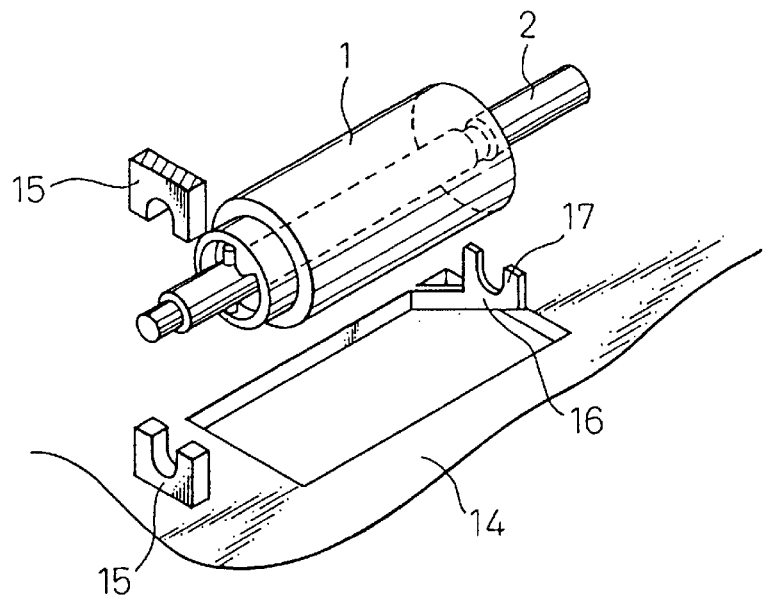
FIG. 6 is a perspective view of a further example of the pick roller assembly.

FIGS. 5 and 6 show further examples of the pick roller assembly. In order that the image reading device 100 can operate stably, it is desirable that the load applied to the pick roller 1 when it freely rotates relative to the roller shaft 2 is smaller than the load applied to the one-way clutch 11 when it freely rotates. However, for example, if the pressure of the sheet separating pad 12 applied to the pick roller 1 is greater, there is a case in which the load applied to the pick roller 1 is not sufficiently small. Examples of FIGS. 5 and 6 solve this problem by a simple means.

In FIG. 5, a cushion 13 comprising a foamed urethane is arranged on a frame portion 14 so as to contact the roller shaft 2, to provide a load to the roller shaft 2, so that the load applied to the pick roller 1 becomes relatively small.

In FIG. 6, the end portion of the roller shaft 2 is supported by a bearing 15 the lower part of which is integrally formed with the plastic frame portion 14, and an arm 16 integrally extends from the frame portion 14. The arm 16 has a thrust flange 17 for preventing the axial movement of the pick roller 1 on the roller shaft 2. The thrust flange 17 is slightly higher than the lower part of the bearing 15, so that when the roller shaft 2 is fitted on the bearing 15 and the thrust flange 17, the arm 16 is slightly bent downwardly and the C-shaped inner surface of the thrust flange 17 is urged to the roller shaft 2. Therefore, the roller shaft 2 is subjected to a load by the thrust flange 17, in a manner similar to the cushion 13 of FIG. 5, so that the load applied to the pick roller 1 becomes relatively small. In addition, the pick roller assembly can be constructed from a smaller number of parts and can be easily assembled.

Figure 7:
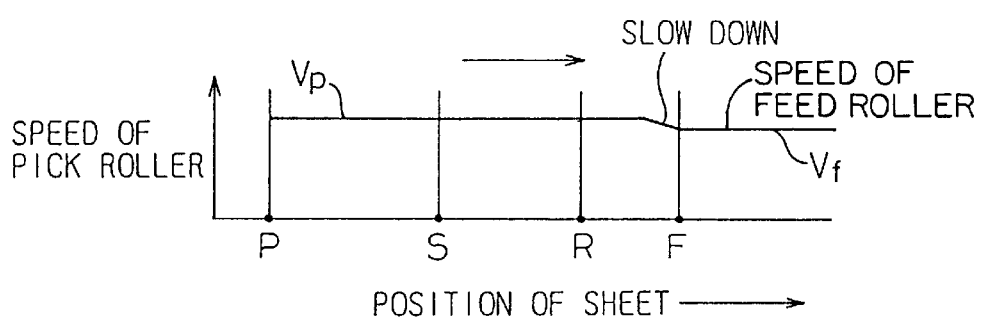
FIG. 7 is a diagram illustrating the control of the pick roller.

FIG. 7 shows a diagram illustrating the control of the pick roller 1 according to an embodiment of the present invention. The image reading device 100 has a control unit (not shown). The vertical axis shows the rotational speed of the pick roller 1, and the horizontal axis shows the position of the leading edge of the sheet 7. P is the pick position, S is the signal-on position of the sheet sensor 50, R is the reading position of the reading head 18, and F is the feed position of the feed roller 9. In this example, the rotational speed of the pick roller 1 is changed as follows. The rotational speed of the pick roller 1 when the leading edge of the sheet 7 is at the pick position P is $V_p$ and the rotational speed $V_p$ of the pick roller 1 is maintained until the leading edge of the sheet 7 reaches a position just before the feed position F. The rotational speed $V_p$ is changed to the rotational speed $V_f$ at that position. The rotational speed $V_p$ is faster than the rotational speed $V_f$, and the rotational speed $V_p$ and $V_f$ are smaller than the rotational speed of the feed roller 9.

According to this arrangement, the travelling speed of the sheet 7, when the sheet 7 is conveyed by the pick roller 1 only and the reading head 18 reads the sheet 7, becomes substantially identical to the travelling speed of the sheet 7 when it is conveyed by the feed roller 9. Therefore, it is possible to avoid an occurrence of a drawn out image which is possible when the leading end portion of the sheet 7 is read. By reducing the rotational speed of the pick roller to a normal speed just before the leading edge of the sheet 7 is pinched by the feed and pinch rollers 9, it is possible to avoid an occurrence of distortion of the image due to a sudden change in the conveying speed.

Figure 8:
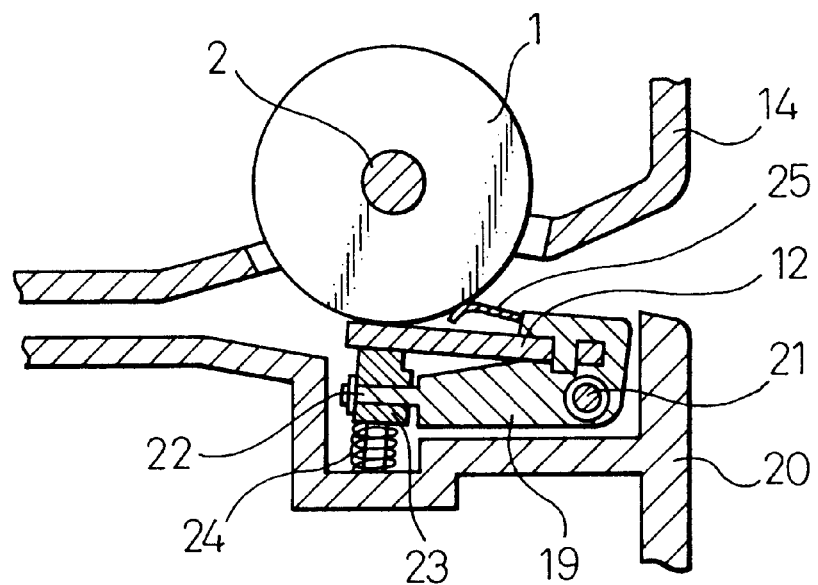
FIG. 8 is a cross-sectional view of a pick roller and a sheet separating pad assembly of an image reading device according to the second embodiment of the present invention.
Figure 9:
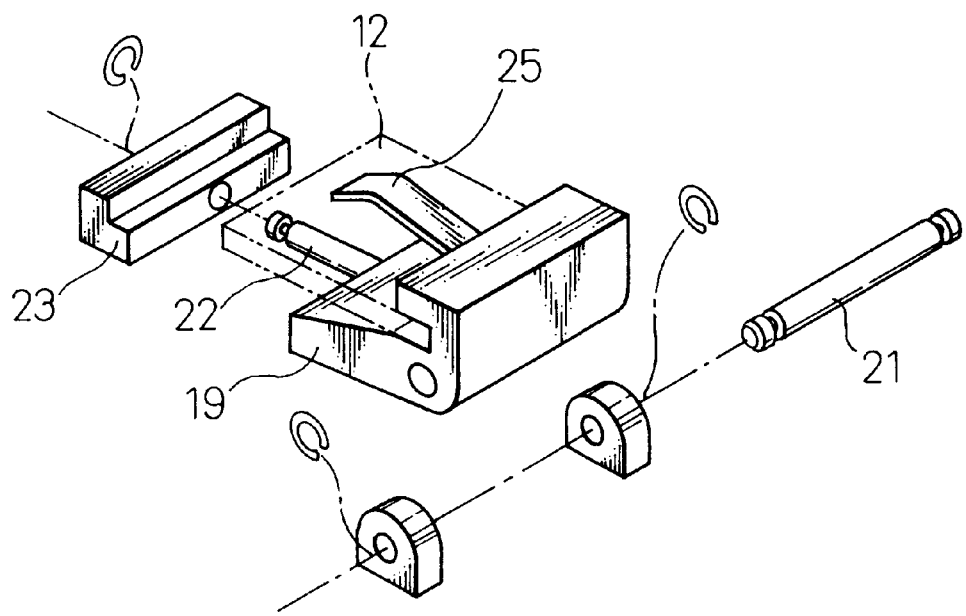
FIG. 9 is an exploded perspective view of the sheet separating pad assembly of FIG. 8.

FIGS. 8 and 9 show the pick roller 1 and the sheet separating pad assembly of the image reading device 100 according to the present invention. The sheet separating pad 12 is mounted to a pad mount member 19 which is pivotally secured to the frame portion 20 via a pivot shaft 21 extending parallel to roller shaft 2. The proximal end of the sheet separating pad 12 is fitted in the groove of the pad mount member 19, and the distal end of the sheet separating pad 12 is located under the pick roller 1. A backing pad shaft 22 extends from the free end of the pad mount member 19 perpendicular to the pivot shaft 21, and a backing pad 23 is swingably fitted on the backing pad shaft 22. The backing pad 23 has an elongated shape having a long side parallel to the roller shaft 2, and the backing pad shaft 22 is located at the center of the backing pad 23.

The backing pad 23 contacts the lower surface of the free end portion of the sheet separating pad 12. A compression spring 24 is arranged between the backing pad 23 and the frame portion 20 to upwardly bias the backing pad 23 and the pad mount member 19 about the pivot shaft 21 so that the upper surface of the free end portion of the sheet separating pad 12 is resiliently urged to the pick roller 1. The single compression spring 24 is arranged under the backing pad 23 at a position below the backing pad shaft 22. A proximal end of a pick spring 25 comprising a spring plate is also attached to the pad mount member 19, by an insert molding.

In this structure, the backing pad 23 can swing about the backing pad shaft 22 to urge the sheet separating pad 12 with a longitudinally uniform force, so that the sheet 7 passing between the pick roller 1 and the sheet separating pad 12 is not subjected to an unbalanced sheet feeding force or an unbalanced sheet separating force. Therefore, it is possible to prevent the sheet 7 from skewing when the sheet 7 passes through the area of the pick roller 1. That is, according to this structure, if there is an error in the shape of the components or an error in the assembly of the roller shaft 2 and the pivot shaft 21 regarding parallelism, such an error is cancelled by the backing pad 23 which can swing about the backing pad shaft 22. No unbalance is caused between the pick roller 1 and the sheet separating pad 12 and the sheet separating pad 12 is urged to the pick roller 1 with a uniform force along the width of the pick roller 1.

In the prior art, as means for preventing unbalance, a plurality of separate backing pads is arranged along the pick roller 1, and urged to the pick roller 1 by respective springs. The present invention is simple in structure and the number of the necessary components is less, compared with the prior art. In the present invention it is possible to reduce the number of the necessary components and assembling steps.

FIGS. 10 to 14 show another example of the sheet separating pad assembly. Similar to the previous example, the sheet separating pad assembly comprises the sheet separating pad 12, the pad mount member 19, the pivot shaft 21, the backing pad shaft 22, and the backing pad 23. In this example, the backing pad shaft 22 is integrally formed with the backing pad 23 and has at its free end a laterally extending locking pawl 26. The pad mount member 19 has an integral support plate 32 having a backing pad shaft hole 27 in which the backing pad shaft 22 is inserted.

Figure 13:
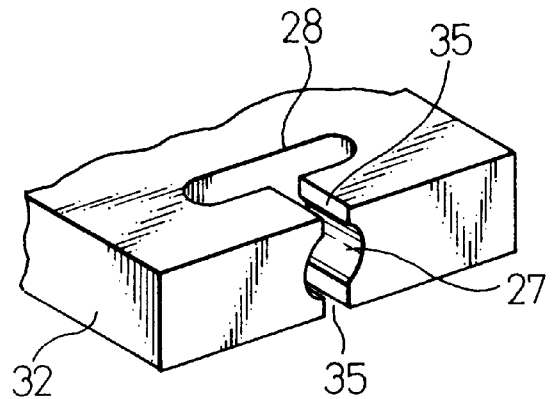
FIG. 13 is a perspective view of the support plate.

The support plate 32 having the backing pad shaft hole 27 is shown in greater detail in FIG. 13. The backing pad shaft hole 27 includes a wide bottom 28 in which the locking pawl 26 of the backing pad shaft 22 can be accommodated. Slits 35 are formed passing through the wall of the backing pad shaft hole 27 to allow the locking pawl 26 to pass therethrough. Therefore, the backing pad shaft 22 can be inserted in the backing pad shaft hole 27 with the backing pad 23 in the vertical position relative to the support plate 32, as shown by the broken line in FIG. 12. The backing pad shaft 22 is then rotated in the backing pad shaft hole 27 so that the locking pawl 26 is accommodated in the wide bottom 28, whereby the axial movement of the backing pad shaft 22 is prevented in the backing pad shaft hole 27 and the swing motion of the backing pad shaft 22 and the backing pad 23 is allowed.

Figure 10:
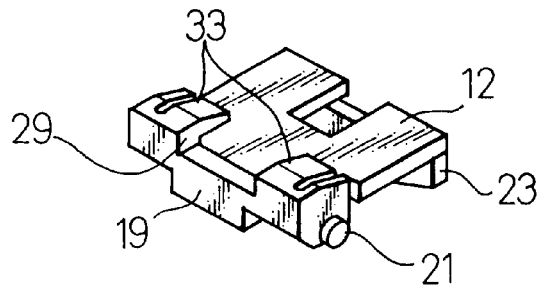
FIG. 10 is a perspective view of another example of the sheet separating pad assembly.
Figure 11:
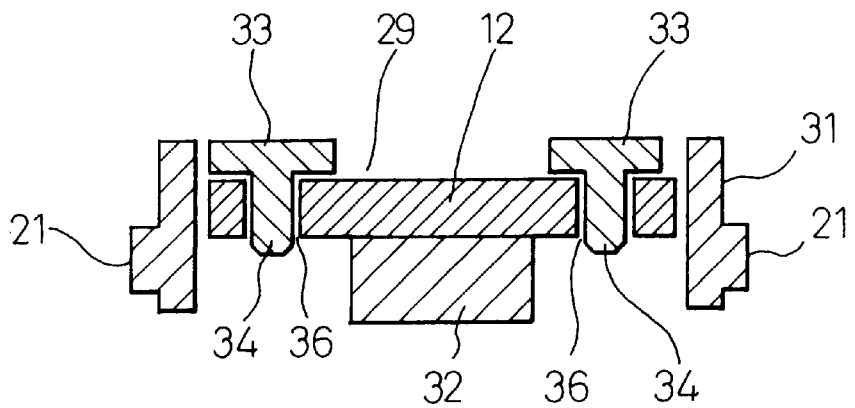
FIG. 11 is a cross-sectional view of the sheet separating pad assembly of FIG. 10.
Figure 12:
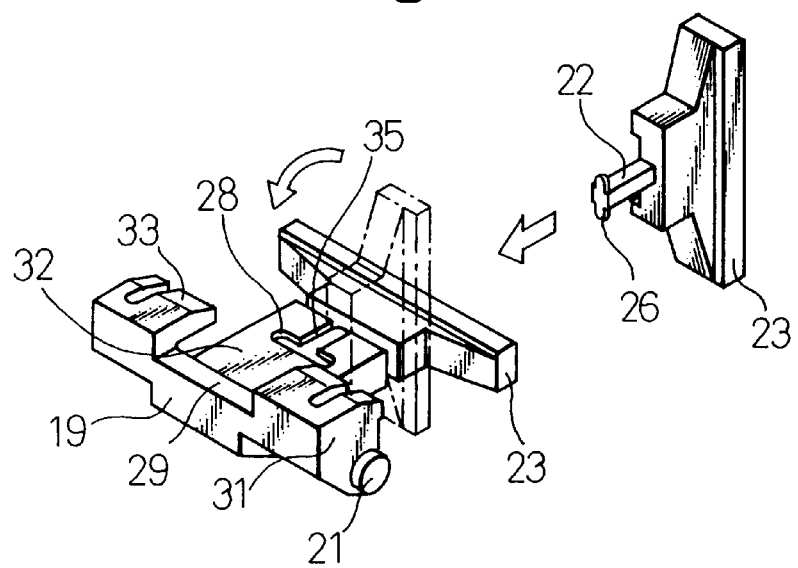
FIG. 12 is an exploded, perspective view of the sheet separating pad assembly of FIG. 10, illustrating the assembly operation.

The pivot shaft 21 is integrally formed with the pad mount member 19 in the form of low projections extending from the side surfaces 31 of the pad mount member 19. The support plate 32 extends perpendicular to the axis of the pivot shaft 21 at the central region of the pad mount member 19. The support plate 32 is the lower wall portion of the pad mount member 19, and the upper wall portion of the pad mount member 19 is located only partly at the rear of the pad mount member 19, as can be seen in FIG. 10. A cutout 29 is provided in the upper wall portion of the pad mount member 19 at the central region thereof. Therefore, it is possible to bend the pad mount member 19 so as to reduce its width, by pressing the side surfaces 31 or the projections forming the pivot shaft 21 of the pad mount member 19. The upper wall portion of the pad mount member 19 also includes slightly rearwardly extending covers 33, which are located above the support plate 32 and on the lateral sides of the support plate 32. The support plate 32 and the covers 33 are arranged in a staggered way. The sheet separating pad 12 can be inserted between the support plate 32 and the covers 33. Fixing pins 34 project from the lower surfaces of the covers 33 to fix the sheet separating pad 12.

The front portion of the sheet separating pad 12 is branched into a fork-shape. The sheet separating pad 12 formed in this way ensures that the swingable backing pad 23 can closely contact the sheet separating pad 12 so that the latter uniformly contacts the pick roller 1. The sheet separating pad 12 has at its proximal end fixing holes 36 in which the fixing pins 34 are inserted.

Figure 14:
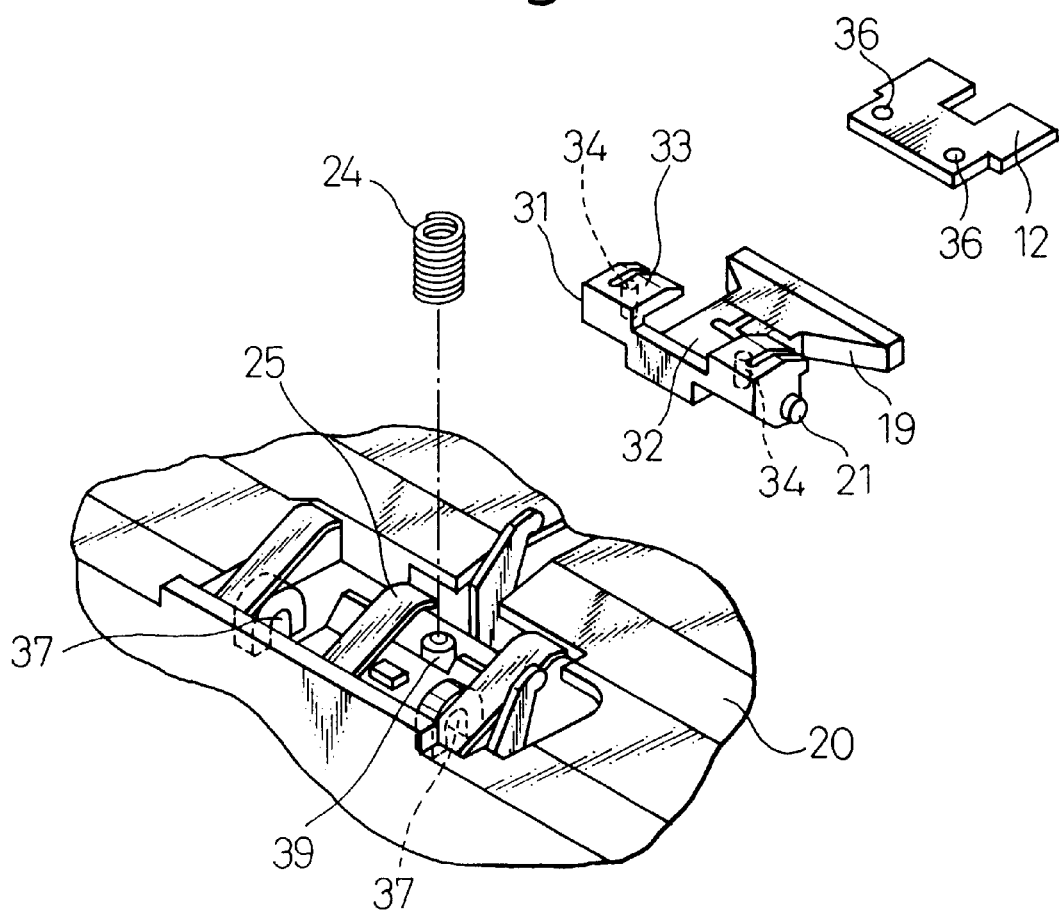
FIG. 14 is an exploded perspective view of the sheet separating pad assembly and a frame portion.
Figure 15:
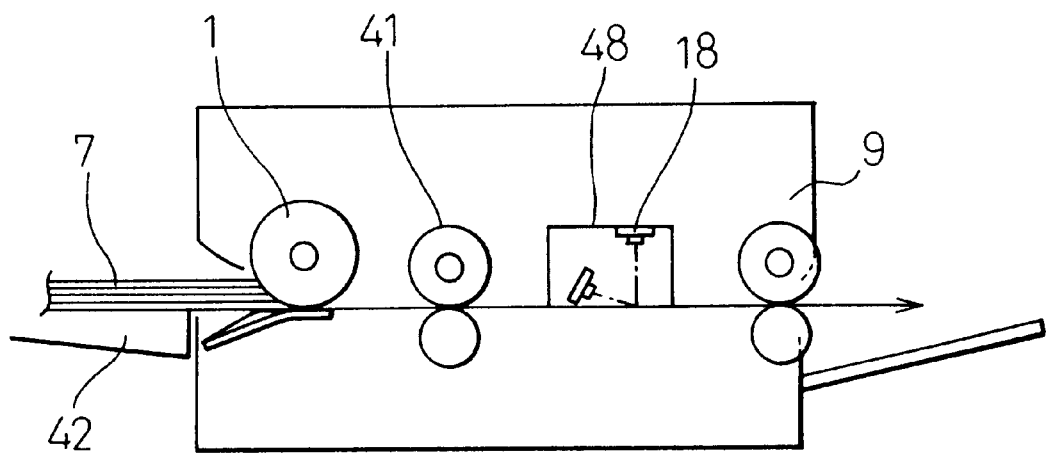
FIG. 15 is a side view of an image reading device of a prior art.
Figure 16:
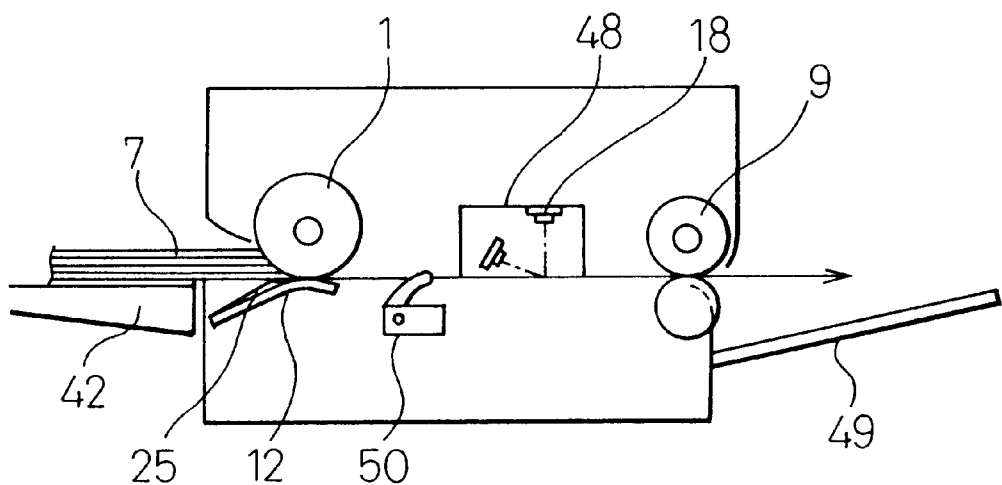
FIG. 16 is a side view of an image reading device of another prior art.
Figure 17:
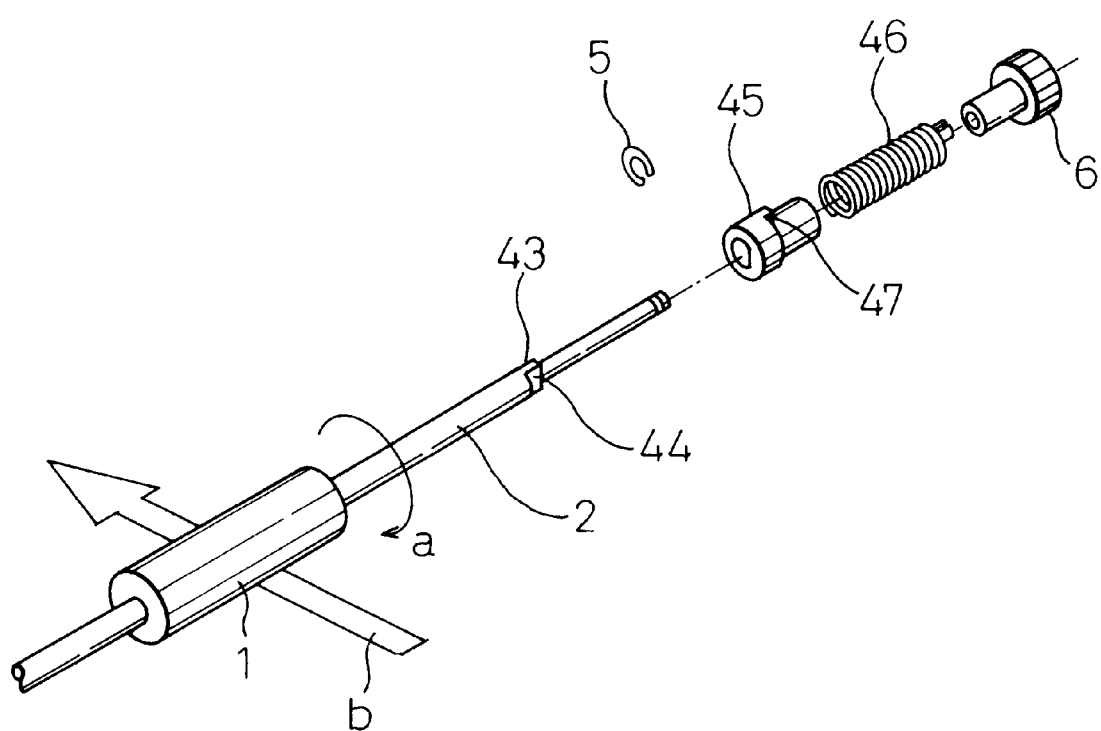
FIG. 17 is an exploded perspective view of a pick roller assembly of FIG. 16.

The pick spring 25 comprising a spring plate is fixed to the frame portion 20 to which the pad mount member 19 is to be attached, as shown in FIG. 14. The frame portion 20 also has pivot shaft holes 37 for inserting the projections forming the pivot shaft 21 and a post 39 for arranging the spring 24 therearound for upwardly urging the backing pad 23.

In the assembly operation of this embodiment, the rear portion of the sheet separating pad 12 is bent in the inverted U-shape and inserted between the support plate 32 and the covers 33. When the sheet separating pad 12 resiliently returns to its initial shape, the fixing pins 34 are inserted in the fixing holes 36. The sheet separating pad 12 is thus attached to the pad mount member 19 by a snap fitting. The sheet separating pad 12 can be removed from the pad mount member 19 in a reverse operation.

The pad mount member 19, having the sheet separating pad 12 attached thereto, is then bent so as to reduce its width, by pressing the side surfaces 31 of the pad mount member 19, and is inserted in the frame portion 20. By releasing the pressing force, the projections forming the pivot shaft 21 are inserted in the pivot shaft holes 37. The spring 24 is arranged on the post 39 prior to the attachment of the pad mount member 19 to the frame portion 20. The pad mount member 19 can be thus easily attached to the frame portion 20, and the pad mount member 19 can be removed from the frame portion 20 in the reverse operation.

As described in greater detail, according to the present invention, it is possible to provide a single feed roller type image reading device having a simple and inexpensive structure. The pick roller assembly and the sheet separating pad assembly are simple. Even when a long sheet is used and overload may occur, the parts are not damaged. It is possible to avoid an occurrence of a drawn out image. It is also possible to effectively stop the sheet from skewing when the sheet passes through the pick roller. It is also possible to easily replace the sheet separating pad.

What is claimed is:

1. An image reading device comprising:
   a frame;
   a hopper for placing sheets to be read thereon;
   an image reading unit;
   a pick roller assembly for picking a sheet on the hopper and conveying the sheet toward the image reading unit, said pick roller assembly comprising a roller shaft, a pick roller rotatably and axially fitted on the roller shaft and a drive member for rotating the roller shaft;
   a feed roller disposed on the opposite side of the pick roller from the image reading unit so that a sheet is driven by the pick roller only, then by the pick roller and the feed roller, and then by the feed roller only, said feed roller being driven at a first rotational speed, said pick roller being driven at a second rotational speed lower than said first rotational speed;
   at least one projection provided on the roller shaft;
   at least one pawl provided in the pick roller, said at least one projection being able to engage with said at least one pawl to transmit the rotation of the roller shaft to the pick roller while the sheet is conveyed by the pick roller only, said at least one projection being able to disengage from said at least one pawl to allow the pick roller to freely rotate relative to the roller shaft while the sheet is conveyed by the feed roller only with the pick roller driven by the feed roller via the sheet; and
   a cushion adapted to contact the roller shaft to give a rotation load to the roller shaft to prevent rotation of the roller shaft and to reduce a load applied to the sheet conveyed by the feed roller.

2. An image reading device according to claim 1, wherein said pick roller has a cylindrical end portion having a cavity, said at least one pawl inwardly projecting from the cylindrical end portion.

3. An image reading device according to claim 2, wherein said cavity has a bottom wall, and said at least one pawl can contact the bottom wall of the cavity in the cylindrical end portion to restrict the axial movement of the pick roller relative to the roller shaft.

4. An image reading device according to claim 1, further comprising a one-way clutch between the roller shaft and the drive member allowing the roller shaft to rotate at a peripheral speed higher than the peripheral speed of the drive member when said pick roller is rotated by the sheet travelling at a speed higher than the peripheral speed of the drive member.

5. An image reading device according to claim 1, wherein said frame includes a plastic frame portion, said plastic frame portion having an integral flexible arm and a thrust flange at the end of the flexible arm, said thrust flange contacting the roller shaft to give a rotation load to the roller shaft due to resilient deformation of the flexible arm.

6. An image reading device comprising:
   a frame;
   a hopper for placing sheets to be read thereon;
   an image reading unit;
   a pick roller for picking a sheet on the hopper and conveying the sheet toward the image reading unit;
   a feed roller disposed on the opposite side of the pick roller from the image reading unit so that a sheet is driven by the pick roller only, then by the pick roller and the feed roller, and then by the feed roller only; and
   a control unit for controlling said pick roller and said feed roller such that said feed roller is rotated at a first rotational speed while a sheet is driven by the feed roller, and said pick roller is rotated at a second rotational speed identical to the first rotational speed until a leading edge of the sheet reaches a position just before said feed roller and at a third rotational speed, which is lower than the first rotational speed, after the leading edge of the sheet passes through said position.

7. An image reading device comprising:
   a frame;
   a hopper for placing sheets to be read thereon;
   an image reading unit;
   a pick roller for picking a sheet on the hopper and conveying the sheet toward the image reading unit;
   a sheet separating pad assembly for contacting the pick roller for preventing a plurality of sheets from being simultaneously conveyed; and
   said sheet separating pad assembly comprising a pad mount member, a sheet separating pad having a first end supported by the pad mount member and a second free end, a backing pad shaft extending from the pad mount member perpendicular to an axis of the pick roller, a backing pad swingable attached to and around the backing pad shaft for urging the sheet separating pad to the pick roller, and a spring arranged below the backing pad shaft to urge the backing pad to thereby urge the sheet separating pad toward the pick roller.

8. An image reading device according to claim 7, further comprising a pivot shaft extending parallel to the axis of the pick roller for pivotally attaching said pad mount member to the frame.

9. An image reading device according to claim 9, wherein said backing pad shaft is integrally formed with the backing pad and has its free end a laterally extending locking pawl, and said pad mount member has a backing pad shaft hole in which the backing pad shaft is inserted, the backing pad shaft hole having a wide bottom in which the locking pawl of the backing pad shaft can be accommodated, said pad mount member also having slits adjacent to the backing pad shaft hole to allow the locking pad to pass therethrough while the backing pad shaft is inserted in the backing pad shaft hole; and
   wherein said pivot shaft is projections extending from the side surfaces of the pad mount member, and said pad mount member has a cutout allowing the pad mount member to bend by pressing the side surfaces of the pad mount member, the frame having pivot shaft holes in which the projections forming the pivot shaft are rotatably secured.

10. An image reading device according to claim 8, wherein said backing pad comprises a support plate and covers arranged in a staggered manner, the sheet separating pad being inserted between the support plate and the covers, the sheet separating pad having at least one fixing pin and one of the support plate and the covers having at least one fixing hole in which said at least one fixing pin is inserted.

11. An image reading device, comprising:

an image reading unit;

a pick roller assembly for picking a sheet and conveying the sheet toward the image reading unit, said pick roller assembly including a roller shaft, a pick roller rotatably mounted on said roller shaft, and a drive member for rotating said shaft;

a feed roller disposed on the opposite side of the pick roller from the image reading unit so that a sheet is driven by the pick roller only, then by the pick roller and the feed roller, and then by the feed roller only, said feed roller being driven at a first rotational speed, said pick roller being driven at a second rotational speed lower than said first rotational speed;

a cushion adapted to contact the roller shaft to apply a rotation load to the roller shaft.

12. An image reading device according to claim 11, further comprising:

at least one projection provided on the roller shaft; and at least one pawl provided in the pick roller, said at least one projection being able to engage with said at least one pawl to transmit the rotation of said roller shaft to said pick roller, said at least one projection being able to disengage from said at least one pawl to allow the pick roller to freely rotate relative to said roller shaft.

* * * * *

UNITED STATES PATENT AND TRADEMARK OFFICE
CERTIFICATE OF CORRECTION

PATENT NO. : 6,025,936
DATED : February 15, 2000
INVENTOR(S) : Satoshi Ishida

It is certified that error appears in the above-identified patent and that said Letters Patent is hereby corrected as shown below:

Col. 7, line 67, delete "to.

Col. 12, line 36, change "swingable" to --swingably--.

Signed and Sealed this

Fourteenth Day of November, 2000

Attest:

Q. TODD DICKINSON

Attesting Officer

Director of Patents and Trademarks